United States Patent
Lian et al.

[11] Patent Number: 5,830,601
[45] Date of Patent: *Nov. 3, 1998

[54] RECHARGEABLE ELECTROCHEMICAL CELL WITH MODIFIED ELECTROLYTE

[75] Inventors: Ke Keryn Lian, Northbrook; Han Wu, Barrington; Changming Li, Vernon Hills, all of Ill.

[73] Assignee: Motorola, Inc., Schaumburg, Ill.

[ * ] Notice: The term of this patent shall not extend beyond the expiration date of Pat. No. 5,552,245.

[21] Appl. No.: 613,697

[22] Filed: Mar. 11, 1996

[51] Int. Cl.$^6$ .................................................. H01M 10/40
[52] U.S. Cl. ........................................... 429/198; 429/206
[58] Field of Search ...................................... 429/198, 206

[56] References Cited

U.S. PATENT DOCUMENTS

| | | | |
|---|---|---|---|
| 2,647,938 | 8/1953 | Taylor | 429/206 X |
| 4,009,056 | 2/1977 | Megahed et al. | 429/126 |
| 4,157,423 | 6/1979 | Gadessaud | 429/206 |
| 4,307,084 | 12/1981 | Drabick et al. | 429/180 |
| 4,605,603 | 8/1986 | Kanda et al. | 429/59 |
| 5,030,527 | 7/1991 | Carpio et al. | 429/192 |
| 5,389,469 | 2/1995 | Passaniti et al. | 429/206 |
| 5,552,245 | 9/1996 | Li et al. | 429/206 X |

FOREIGN PATENT DOCUMENTS

| | | |
|---|---|---|
| 58-46579 | 3/1983 | Japan . |
| 60-50865 | 3/1985 | Japan . |

*Primary Examiner*—Stephen Kalafut
*Attorney, Agent, or Firm*—Kenneth M. Massaroni

[57] ABSTRACT

An electrochemical battery cell (10) including a zinc electrode (20), and may be fabricated with an electrolyte (50) system including an electrolyte active species and a modifier. The electrolyte active species is typically a metal hydroxide such as KOH or NaOH, while the modifier may be a porphine such as a metal porphine, and/or a polymeric material. The polymeric material may be, for example, a polyvinyl resin such as polyvinyl alcohol or polyvinyl acetate. The resulting electrolyte typically includes between 3 and 10 weight percent of the polyvinyl resin, 5 and 50 weight percent of the metal hydroxide, and between 1 PPM and 1 wt % of the modifier. Employing such an electrolyte in a cell including a zinc electrode results in an energy storage device having improved power density and substantially longer cycle life.

33 Claims, 2 Drawing Sheets

RECHARGEABLE ELECTROCHEMICAL CELL WITH MODIFIED ELECTROLYTE

TECHNICAL FIELD

This invention relates in general to electrochemical cells and in particular to electrochemical cells having at least one electrode formed of zinc, and electrolytes for such cells.

BACKGROUND

Energy generation and storage has long been a subject of study and development. Of special significance is the storage of electrical energy in a compact form that can be easily charged and discharged, such as a rechargeable battery and/or electrochemical capacitor. High power, especially high current pulse rechargeable electrochemical storage devices are required in applications using electrical pulses, such as two-way communications, power tools, and laptop computers to name but a few. In these devices, high electrochemical kinetic rate, long cycle life of the electrodes, and good ionic conductivity of the electrolyte are extremely important features.

Zinc has long been considered an ideal electrochemical material. Zinc electrodes provide high power and high energy density as required by most current electrical devices. Moreover, zinc is readily available, cheap, and relatively environmentally benign. Unfortunately, electrochemical cells fabricated of zinc suffer from a very short cycle life. This prevents its use in most commercial rechargeable battery cells. The two most common failure mechanisms associated with zinc electrodes are both the result of zinc dendrite formation, which results in: (1) internal shorting as dendrites grow through the porous separator and reach the counter electrode; and (2) shape change of the zinc electrode leading to decreased capacity. Although the extent is different, both of the above described failure mechanisms involve the growth of zinc dendrites.

The reasons for dendritic growth in zinc are not fully understood. The most accepted hypothesis for dendritic growth suggests that it is attributable to the fact that zinc ions dissolve in strong alkaline solutions. The equilibrium solubility of ZnO in 6.9M KOH is 6.92 moles and it has been observed that as much as 2.42 moles of zinc can dissolve in one liter of KOH electrolyte during discharge. This has been known in the field for many years and was first reported in an article by Eisenberg, et al. in the *Journal of the Electrochemical Society*, 108, 909 (1961).

High ionic solubility together with the fact that the zinc deposition reaction is relatively fast makes zinc unstable and sensitive to the current density distribution during charge. Specifically, a small change in local current density results in a large difference in the amount of zinc deposited at different sites. Therefore, any non-uniformity in the zinc electrode surface would produce accelerated growth at the point where current density is the highest. This accelerated growth results in ever larger islands of zinc deposited at that point, thus further changing current density distribution. It may be appreciated therefore that a change in local current would result in greater deposition of zinc which results in a greater change in local current. Thus, as the localized area grows into the bulk of the solution, higher zinc concentration increases the growth rate and causes the dendrites to grow even faster.

Accordingly, there exists a need for an electrochemical cell system in which zinc dendrite growth is reduced or at least suppressed sufficiently to allow a zinc electrochemical cell to have a cycle life which is substantially the same as other commercially available systems. The electrochemical system should make use of commonly available materials, which are both inexpensive and environmentally benign. Moreover, the system should lend itself to easy manufacturability and low cost.

DETAILED DESCRIPTION OF THE PREFERRED EMBODIMENT

Figure 1:
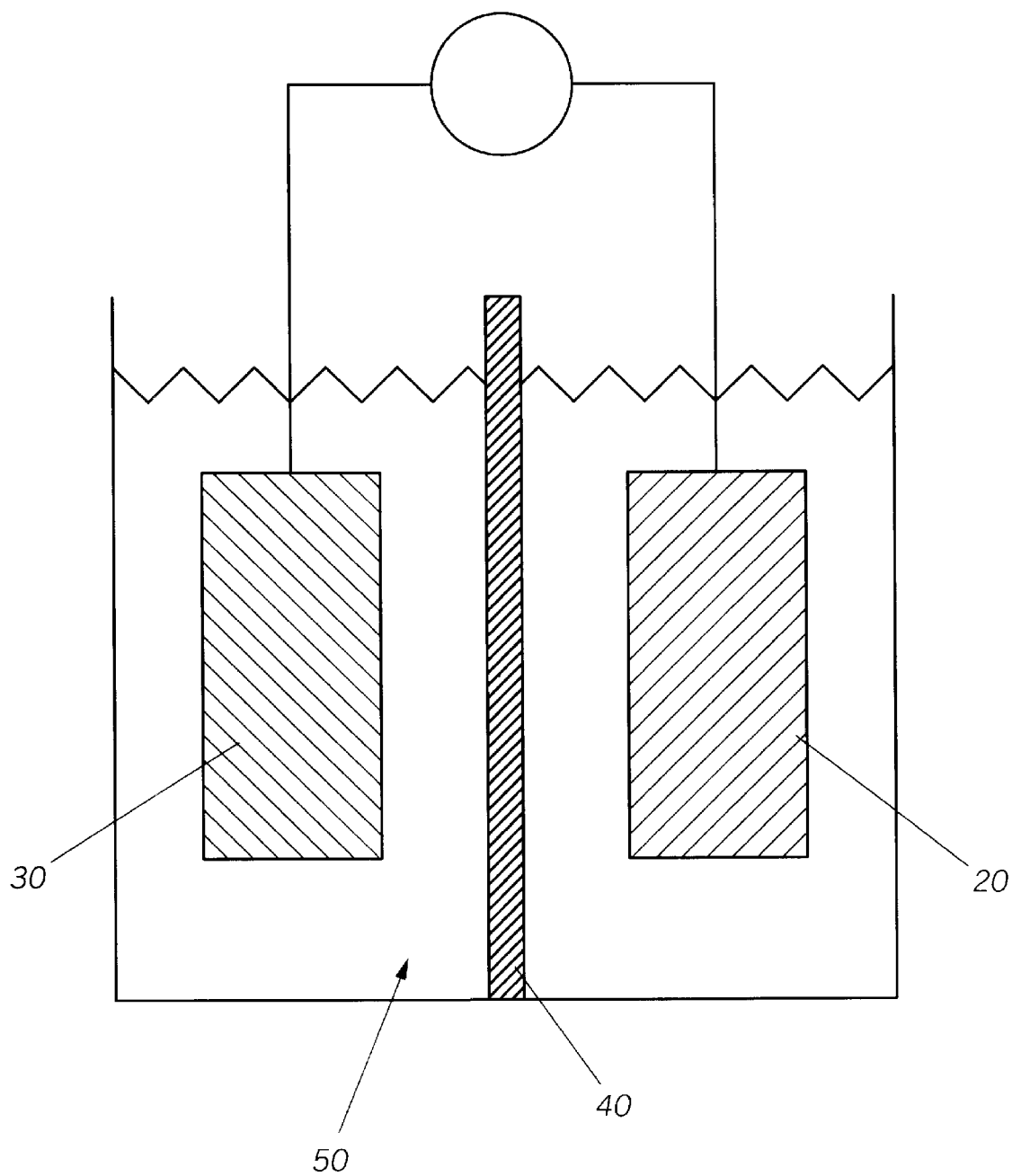
FIG. 1 is a schematic view of an electrochemical energy storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic view of an electrochemical energy storage device in accordance with the instant invention. The device 10 may be either an electrochemical battery or an electrochemical capacitor. The electrochemical energy storage device 10 includes first and second electrodes 20 and 30, and a separator electrode 40 disposed between said electrodes. The separator is electrically insulating and ionically conductive to the liquid electrolyte 50 in which the electrodes are immersed. Exemplary separatory materials are well known in the field, and include NAFION, Cellulose, Cellguard, and felt to name but a few. The first electrode 20 or the anode is fabricated of a material selected from the group of zinc, zinc oxide, or zinc alloys, such as ZN/Hg, Zn/Pb, Zn/Cd, Zn/Bi, Zn/Sn, Zn/Al, Zn/Mg, and combinations thereof. In one preferred embodiment, the zinc electrode is a zinc oxide.

The second electrode 30 or cathode of the electrochemical charge storage device 10 may be fabricated of materials which are selected from the group of materials consisting of, but not limited to, nickel, nickel hydroxide, NiOOH, AgO, $HgO_2$, $MnO_2$, Air, Co oxides, and combinations thereof. In one preferred embodiment, the second electrode 30 is fabricated of nickel hydroxide material.

The electrolyte 50 disposed between and in contact with the first and second electrodes is a metal hydroxide which includes one or more modifiers. The metal hydroxide electrolyte active species may be selected from the group of materials consisting of potassium hydroxide, sodium hydroxide, ammonium hydroxide, lithium hydroxide, cesium hydroxide, beryllium hydroxide, magnesium hydroxide, calcium hydroxide, strontium hydroxide, barium hydroxide and combinations thereof.

In one embodiment, the modifier in the electrolyte is a polyvinyl resin such as polyvinyl alcohol (PVA). Other similar modifiers include aromatic aldehydes such as anisaldhyde, benzoic acid, and vanillin to name a few. Preferably, the polyvinyl alcohol has a molecular weight between 20,000 and 500,000. It is to be understood however, that other molecular weights in the range of 5,000 to 20,000 or above 500,000 may be useful as well.

In a second embodiment, the modifier included in the electrolyte is a porphine, and typically a metal porphine selected from the group of materials selected from Fe porphine, Zn porphine, Co porphine, Mu porphine, Cu porphine, Ni porphine, and combinations thereof. In one preferred embodiment, the porphine is Fe meso-tetra(4-sulfonatophenyl) porphine. The electrolyte modifier may also be a combination of both a porphine and PVA.

The porphine is present in the electrolyte in concentrations ranging from approximately 1 part per million (PPM) to approximately 1 wt %. Similarly, polyvinyl alcohol is typically present in the range of between 1 wt % and 40 wt % of the electrolyte, and preferably 3–10 wt %. The metal hydroxide electrolyte active species is typically present in the range of between 5 and 50 wt %.

The invention may be better understood from a perusal of the following examples.

EXAMPLES

An electrochemical cell in accordance with the invention was prepared as follows: 10 grams (g) PVA powder was dissolved in 110 milliliters of deionized water at approximately 100° C. The PVA was dissolved in the deionized water while being vigorously stirred for approximately 45 minutes. Concurrently, an aqueous KOH solution was prepared comprising approximately 30 wt % KOH and water in a method well known in the art. The KOH solution so prepared was added to the dissolved PVA solution at a temperature of approximately 50° C. over a period of 10 minutes at 1:1 by volume. The solutions were continuously stirred during this time.

After addition of the KOH solution and while stirring continued, the porphine, specifically an Fe porphine was added to the solution. More particularly, an amount of 0.1 milliliters of 0.1% Fe porphine was added to the KOH/PVA solution which at this time was approximately 20 milliliters.

Thereafter, electrochemical cells were prepared as follows:

A first electrode was fabricated of a zinc foil, while the second electrode was a nickel hydroxide $Ni(OH)_2$ electrode as is found in commercially available nickel metal hydride or nickel cadmium batteries. Cells were fabricated in both a flooded liquid electrolyte system with a conventional separator, and in a PVA gel system as is known in the art. The PVA/KOH/porphine electrolyte was compared to a standard PVA/KOH electrolyte, a liquid KOH porphine electrolyte and a conventional liquid KOH electrolyte, in each case with a zinc foil negative electrode and a nickel hydroxide positive electrode. All cells were cycled as follows: Charge at 50 milliamperes (mA) until 2.1 volts is reached, wait for 5 seconds, discharge at 100 mA until the cell voltage drops to 1.4 volts. The results of this testing are summarized in Table 1 below.

| Cell Number | Electrolyte | Capacity (mAh) | Cycle Life (cycles) |
|---|---|---|---|
| 1 | Liquid KOH | 15–60 | 19 |
| 2 | Liquid KOH-porphine | 15–60 | 80 |
| 3 | PVA-KOH | 4–5 | 1838 |
| 4 | PVA-KOH-porphine | 4–5 | 1622 |

The capacity of cells 1 and 2 increased while they were cycled due to the increase in zinc surface area. The capacity was good, particularly at the final cycles, indicating the continuous dissolution of the zinc electrodes. The capacity of cells 3 and 4 was fairly constant throughout the cycling, decreasing only at the end due to, it was hypothesized, drying out of the electrolyte. After all cells failed, they were disassembled and analyzed. It was found that in cell 1 the zinc electrode experienced significant shape change and dendritic growth as would have been expected from the prior art. Similarly, cell 2 showed dendritic growth, but such growth occurred after substantially greater cycles. Conversely, the zinc electrode in cells 3 and 4 stayed intact and failure was brought about by the drying out of the electrolyte. It may be appreciated that by adding PVA and porphine to traditionally aqueous electrolytes, dendrite growth and shape change of the zinc electrode may be substantially reduced and that cycle life may be increased by at least one to two orders of magnitude.

Although the mechanism for the PVA and porphine extending the cycle life of the zinc electrodes is not entirely clear, it is hypothesized that the modifiers, PVA and/or porphine, having positively charged functional groups, adsorb on or otherwise bond to those areas on the zinc electrode where the current density is higher. In other words, the modifier, i.e., PVA molecules or porphines, preferentially grow on the sites where zinc dendrite growth would otherwise have been favored. Further, with PVA in the solution, the concentration of KOH decreases, thus reducing the solubility of the zinc.

Figure 2:
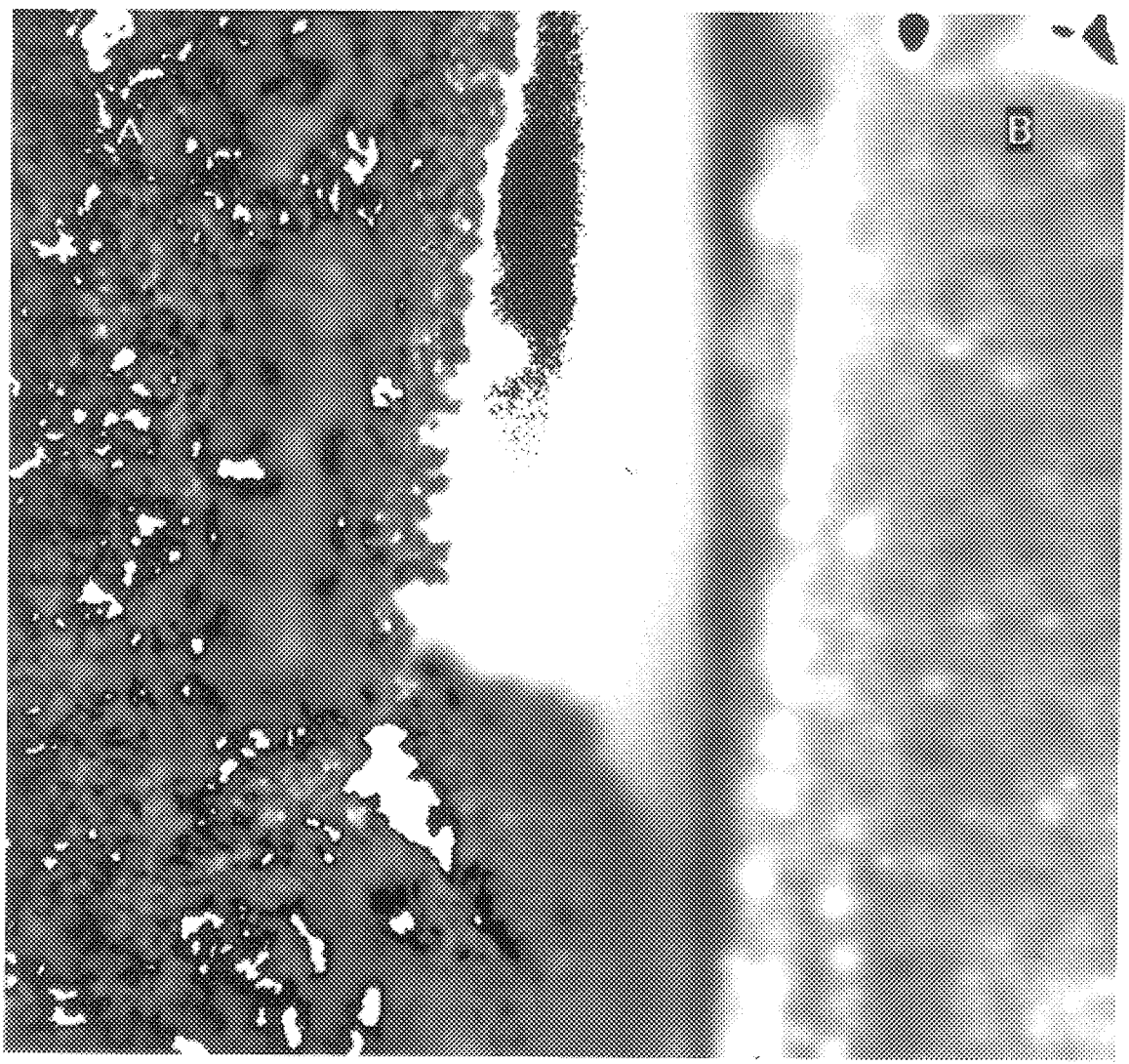
FIG. 2 is a pair of optical micrographs for two zinc electrodes, one treated in a conventional electrolyte, and a second in a modified electrolyte in accordance with the invention.

To illustrate the point, and referring now to FIG. 2, there is illustrated an optical micrograph of two zinc electrodes. A, on the left was cycled in a conventional KOH electrolyte and shows substantial dendrite growth. Conversely, B on the right was cycled in a PVA-KOH liquid electrolyte. The second electrode is essentially free of dendrite growth.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrochemical cell comprising:
    a first electrode fabricated of a material selected from the group of zinc, zinc oxide, zinc alloys, and combinations thereof said first electrode being further characterized as possessing areas of low current density and areas of high current density;
    a second electrode; and
    an electrolyte in contact with said first and second electrodes, said electrolyte comprising an electrolyte active species and a modifier comprising poly(vinyl) alcohol and at least one of poly(vinyl) acetate or a porphine, which modifier bonds to said areas of high current density on said first electrode.

2. A rechargeable, electrochemical cell as in claim 1, wherein the poly(vinyl) alcohol has a molecular weight between 20,000 and 500,000.

3. A rechargeable, electrochemical cell as in claim 1, wherein the poly(vinyl) alcohol is present in the electrolyte in the range of 1 wt % to 40 wt %.

4. A rechargeable, electrochemical cell as in claim 1, wherein the poly(vinyl) alcohol is present in the electrolyte in the range of 3 wt. % to 10 wt %.

5. A rechargeable, electrochemical cell as in claim 1, wherein said electrolyte active species is a metal hydroxide selected from the group of KOH, NaOH, LiOH, CaOH, SrOH, CeOH, MgOH, BaOH, and combinations thereof.

6. A rechargeable, electrochemical cell as in claim 5, wherein said metal hydroxide is KOH.

7. A rechargeable, electrochemical cell as in claim 5, wherein said metal hydroxide is present in said electrolyte in the range of 5 wt % to 50 wt %.

8. A rechargeable, electrochemical cell as in claim 1, wherein said modifier is a metal porphine selected from the group of Fe porphine, Cu porphine, Mn porphine, Zn porphine, Co porphine, Ni porphine, and combinations thereof.

9. A rechargeable, electrochemical cell as in claim 8, wherein said porphine modifier is Fe meso-tetra(4-sulfonatophenyl) porphine.

10. A rechargeable, electrochemical cell as in claim 8, wherein said porphine modifier is present in said electrolyte in the range of 1 PPM to 1 wt %.

11. A rechargeable, electrochemical cell as in claim 1, wherein said second electrode is fabricated of a nickel containing material.

12. A rechargeable, electrochemical cell as in claim 1, wherein said second electrode is fabricated of $Ni(OH)_2$.

13. A rechargeable electrochemical cell comprising first and second electrodes, at least one of which is fabricated of zinc, zinc oxide, or a zinc alloy, and an electrolyte comprising an electrolyte active species and a modifier including a porphine and poly(vinyl) alcohol.

14. A rechargeable, electrochemical cell as in claim 13, wherein the poly(vinyl) alcohol has a molecular weight between 20,000 and 500,000.

15. A rechargeable, electrochemical cell as in claim 13, wherein the poly(vinyl) alcohol is present in the electrolyte in the range of 1 wt % to 40 wt %.

16. A rechargeable, electrochemical cell as in claim 15, wherein the poly(vinyl) alcohol is present in the electrolyte in the range of 3 wt. % to 10 wt %.

17. A rechargeable, electrochemical cell as in claim 13, wherein said electrolyte active species is a metal hydroxide selected from the group of KOH, NaOH, LiOH, CeOH, SrOH, CaOH, MgOH, BaOH, and combinations thereof.

18. A rechargeable, electrochemical cell as in claim 17, wherein said metal hydroxide is KOH.

19. A rechargeable, electrochemical cell as in claim 17, wherein said metal hydroxide is present in said electrolyte in the range of 5 wt % to 50 wt %.

20. A rechargeable, electrochemical cell as in claim 13, wherein said porphine modifier is a metal porphine selected from the group of Fe porphine, Cu porphine, Mn porphine, Zn porphine, Co porphine, Ni porphine, and combinations thereof.

21. A rechargeable, electrochemical cell as in claim 20, wherein said porphine modifier is Fe meso-tetra(4-sulfonatophenyl) porphine.

22. A rechargeable, electrochemical cell as in claim 13, wherein said porphine modifier is present in said electrolyte in the range of 1 PPM to 1 wt %.

23. A rechargeable, electrochemical cell as in claim 13, wherein said second electrode is fabricated of a nickel containing material.

24. A rechargeable, electrochemical cell as in claim 13, wherein said second electrode is fabricated of $Ni(OH)_2$.

25. A rechargeable electrochemical battery cell comprising first and second electrodes, at least one of which is fabricated of zinc, a zinc oxide, or a zinc alloy, and an electrolyte system comprising KOH, poly(vinyl) alcohol and a porphine.

26. A rechargeable, electrochemical cell as in claim 25, wherein the poly(vinyl) alcohol is present in the electrolyte system in the range of 1 wt % to 30 wt %.

27. A rechargeable, electrochemical cell as in claim 26, wherein the poly(vinyl) alcohol is present in the gel electrolyte in the preferred range of 3 wt. % to 10 wt %.

28. A rechargeable, electrochemical cell as in claim 25, wherein said KOH is present in said electrolyte in the range of 5 wt % to 50 wt %.

29. A rechargeable, electrochemical cell as in claim 25, wherein said porphine is a metal porphine selected from the group of Fe porphine, Cu porphine, Mn porphine, Zn porphine, Co porphine, Ni porphine, and combinations thereof.

30. A rechargeable, electrochemical cell as in claim 25, wherein said porphine modifier is Fe meso-tetra(4-sulfonatophenyl) porphine.

31. A rechargeable, electrochemical cell as in claim 25, wherein said porphine is present in said electrolyte in the range of 1 PPM to 1 wt %.

32. A rechargeable, electrochemical cell as in claim 25, wherein said second electrode is fabricated of a nickel containing material.

33. A rechargeable, electrochemical cell as in claim 25 wherein said second electrode is fabricated of $Ni(OH)_2$.

* * * * *